United States Patent
Hallock et al.

(10) Patent No.: US 11,801,781 B1
(45) Date of Patent: Oct. 31, 2023

(54) SEAT ASSEMBLY

(71) Applicant: Lear Corporation, Southfield, MI (US)

(72) Inventors: Joshua Hallock, Warren, MI (US);
Lisa Swikoski, West Bloomfield, MI (US); Samuel Blair, Troy, MI (US);
David Abdella, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/714,511

(22) Filed: Apr. 6, 2022

(51) Int. Cl.
*B60N 2/58* (2006.01)
*B60N 2/70* (2006.01)
*A47C 7/02* (2006.01)

(52) U.S. Cl.
CPC .................................. *B60N 2/5825* (2013.01)

(58) Field of Classification Search
CPC .. B60N 2/5825; B60N 2/7017; B60N 2/5891; B60N 2/6027; B60N 2/70; B60N 2/72; A47C 31/023; F16B 45/00; F16B 45/02
See application file for complete search history.

(56) References Cited

U.S. PATENT DOCUMENTS

| | | | | |
|---|---|---|---|---|
| 1,667,541 A | * | 4/1928 | Edeburn | F16B 45/00 24/698.2 |
| 2,787,435 A | * | 4/1957 | Shields | F16B 45/02 24/601.2 |
| 3,829,935 A | * | 8/1974 | Critchfield | A47C 31/026 24/907 |
| 3,972,093 A | * | 8/1976 | Aimar | B68G 7/08 24/907 |
| 5,605,373 A | * | 2/1997 | Wildern, IV | B60N 2/5825 297/218.4 |
| 5,624,094 A | * | 4/1997 | Protz, Jr. | F16B 45/02 24/601.2 |
| 5,641,552 A | * | 6/1997 | Tillner | B60N 2/5825 428/102 |
| 5,733,001 A | * | 3/1998 | Roberts | B60N 2/5825 24/297 |
| 5,737,809 A | * | 4/1998 | Driver | F16B 45/04 24/601.2 |

(Continued)

FOREIGN PATENT DOCUMENTS

WO 0124665 A1 4/2001

OTHER PUBLICATIONS

International Search Report and Written Opinion for Application No. PCT/US2023/010964, dated Feb. 22, 2023, 9 pages.

*Primary Examiner* — Shin H Kim
(74) *Attorney, Agent, or Firm* — Brooks Kushman P.C.

(57) ABSTRACT

A seat assembly has a seating cushion defining a first surface to support an occupant and a second surface opposite to the first surface, with the first surface further defining a trench. A fastener has a longitudinal body with a central region positioned between a first end region and a second end region, and a base extending outwardly from the second end region and transversely to the body. The first end region tapers in a direction away from the second end region, and the central region of the body defines a recess intersecting a side wall of the body and angled inwardly and towards the first end region to form a hook. The fastener extends through the seating cushion with the base abutting the second surface, and the first end region of the body extending into the trench.

20 Claims, 4 Drawing Sheets

(56) References Cited

U.S. PATENT DOCUMENTS

| | | | | |
|---|---|---|---|---|
| 5,788,332 A * | 8/1998 | Hettinga | ............... | B60N 2/7017 297/452.59 |
| 5,826,312 A * | 10/1998 | Schroder | ............... | F16B 5/0692 24/601.2 |
| 6,899,399 B2 | 5/2005 | Ali et al. | | |
| 7,287,305 B2 * | 10/2007 | Bednarski | ............. | B60N 2/5825 24/297 |
| 7,487,575 B2 * | 2/2009 | Smith | ....................... | B68G 7/12 24/297 |
| D649,024 S * | 11/2011 | Takazakura | ..................... | D8/367 |
| 8,099,837 B2 * | 1/2012 | Santin | .................. | A47C 31/023 24/297 |
| 8,197,010 B2 * | 6/2012 | Galbreath | ............ | B60N 2/5825 297/452.6 |
| 8,857,018 B2 * | 10/2014 | Murasaki | ............. | B60N 2/5825 24/601.2 |
| 9,180,804 B2 * | 11/2015 | Tsunoda | ................ | F16B 5/0642 |
| 10,473,136 B2 * | 11/2019 | Line | ........................ | B60N 2/682 |
| 10,676,000 B2 | 6/2020 | Galbreath et al. | | |
| 10,793,077 B2 * | 10/2020 | Villacres Mesias | ...... | B60R 7/08 |
| 10,933,783 B1 * | 3/2021 | Hamlin | ................ | B60N 2/5825 |
| 10,967,769 B2 * | 4/2021 | Navarro | ............... | B60N 2/5891 |
| 11,192,477 B2 * | 12/2021 | Michalak | ............... | B60N 2/686 |
| D951,075 S * | 5/2022 | Zhang | ............................. | D8/367 |
| 2003/0213105 A1 * | 11/2003 | Bednarski | ............ | B60N 2/5825 24/289 |
| 2004/0036325 A1 * | 2/2004 | Diemer | .................. | H05B 3/146 297/180.12 |
| 2004/0195877 A1 * | 10/2004 | Demain | .................. | B29C 33/12 297/218.2 |
| 2006/0037222 A1 * | 2/2006 | Hunt | ................ | G06K 19/06009 235/494 |
| 2007/0011853 A1 * | 1/2007 | Smith | .................. | B60N 2/5825 24/545 |
| 2008/0258523 A1 * | 10/2008 | Santin | .................. | B60N 2/5825 29/428 |
| 2009/0033131 A1 * | 2/2009 | Clauser | .................. | B68G 7/052 297/218.4 |
| 2009/0064471 A1 * | 3/2009 | Santin | .................. | B60N 2/6027 24/581.11 |
| 2011/0278902 A1 * | 11/2011 | Galbreath | ................ | B60N 2/70 297/452.48 |
| 2012/0187731 A1 * | 7/2012 | Guadagno | ............ | B60N 2/5883 29/428 |
| 2015/0135485 A1 * | 5/2015 | Santin | ....................... | F16B 2/22 29/453 |
| 2016/0123529 A1 * | 5/2016 | Ogawa | .................... | F16B 45/00 248/222.52 |
| 2018/0208091 A1 * | 7/2018 | Navarro | ............... | B60N 2/5816 |
| 2018/0229634 A1 * | 8/2018 | Baisch | ...................... | A47C 7/24 |
| 2019/0344691 A1 | 11/2019 | Liau et al. | | |
| 2019/0368078 A1 * | 12/2019 | Booth | .................. | B60N 2/5825 |
| 2021/0053472 A1 * | 2/2021 | Eldridge | .............. | A47C 31/023 |
| 2022/0242287 A1 * | 8/2022 | Cuerda | ..................... | F16B 2/22 |

\* cited by examiner

SEAT ASSEMBLY

TECHNICAL FIELD

Various embodiments relate to a fastener for use with a seat assembly, a seat assembly, and a method of assembling the seat assembly.

BACKGROUND

Vehicle seat assemblies may be provided with fasteners, for example, that are used to retain the trim cover to the underlying cushion. Examples of vehicle seat assemblies and fasteners may be found in U.S. Pat. Nos. 6,899,399, 10,676,000, U.S. Pat. Pub. No. 2019/0344691, and PCT Pub. No. WO 01/24665.

SUMMARY

In an embodiment, a seat assembly is provided with a seating cushion defining a first surface to support an occupant and a second surface opposite to the first surface, with the first surface further defining a trench. A fastener is provided with a longitudinal body having a central region positioned between a first end region and a second end region, and a base extending outwardly from the second end region and transversely to the body. The first end region tapers in a direction away from the second end region, and the central region of the body defining a recess intersecting a side wall of the body and angled inwardly and towards the first end region to form a hook. The fastener extends through the seating cushion with the base abutting the second surface, and the first end region of the body extends into the trench.

In a further embodiment, the seating cushion is formed from a stranded-mesh material member.

In a yet further embodiment, the stranded-mesh material member comprises a polymeric mesh having a plurality of integrated polymeric strands.

In another further embodiment, a trim cover is provided and forms a seating surface, and a tie down is connected to the trim cover. The fastener engages with the tie down to connect the trim cover to the seating cushion.

In an even further embodiment, a cushion layer is positioned between the first surface of the seating cushion and the trim cover.

In another even further embodiment, the tie down defines an aperture adjacent to a bead of the tie down, and the body of the fastener extends through the aperture to connect the trim cover to the seating cushion.

In a yet even further embodiment, the aperture is defined at least in part by the bead of the tie down.

In a further embodiment, a frame is provided and supports the seating cushion.

In another further embodiment, the body defines a first finger extending from the first end region towards the base and to a first distal end, with the first finger cooperating with the central region to define the recess and form the hook.

In an even further embodiment, the body defines a second finger extending from the second end region towards the first end region and to a second distal end, with the second finger cooperating with the central region to define the recess.

In a yet even further embodiment, the second finger is angled inwardly relative to the body to the second distal end.

In another yet even further embodiment, the first distal end and the second distal end are nonoverlapping in a transverse direction.

In a further embodiment, the fastener defines a central aperture extending longitudinally through the second end region and intersecting the base.

In an even further embodiment, the central aperture intersects the recess.

In another further embodiment, the base has a first surface facing the first end region of the body, and a second surface opposite to the first surface. The base defines at least one post extending longitudinally outwardly from the first surface of the base, the at least one post spaced apart from the body.

In a further embodiment, the base defines an indicia indicative of an orientation of the hook.

In another further embodiment, the central region defines at least one barb extending outwardly therefrom and angled away from the first end region.

In another embodiment, a fastener is provided with a member forming a longitudinal body with a central region positioned between a first end region to a second end region. The first end region tapers in a direction away from the second end region. The member forms a base extending outwardly from the second end region and transversely to the body. The central region of the body defines a recess that intersects a side wall of the member and extends transversely into the central region of the body and towards the first end region to form a hook.

In yet another embodiment, a method of assembling a seat assembly is provided. A tapered distal end of a fastener is inserted through a cushion until a base of the fastener abuts a first outer surface of the cushion and the distal end extends into a trench formed in a second outer surface of the cushion opposite to the first surface. A trim cover with a tie down is positioned over the second surface of the cushion. A hook defined by the fastener is inserted through an aperture defined by the tie down to connect the trim cover to the cushion.

In a further embodiment, cushion is formed from a stranded-mesh material without a preformed hole for the fastener.

DETAILED DESCRIPTION

As required, detailed embodiments of the present invention are disclosed herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
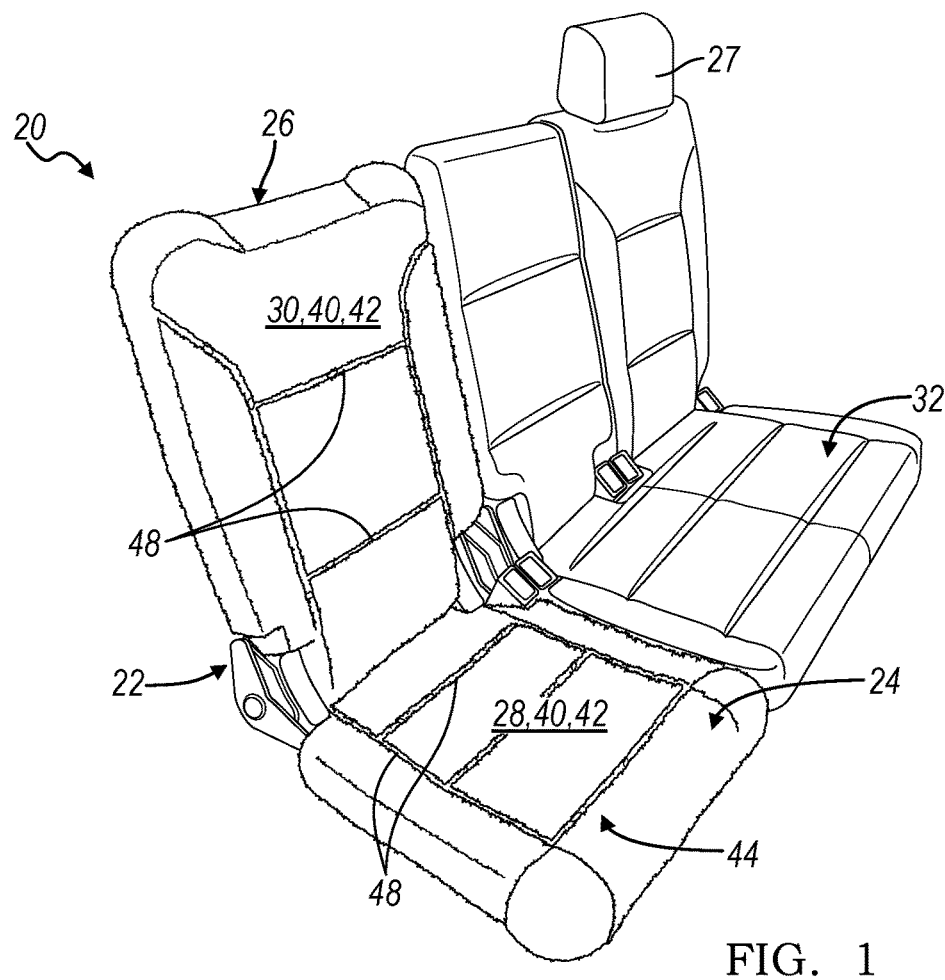
FIG. 1 illustrates a perspective view of a seat assembly according to an embodiment.

Referring to FIG. 1, a seat assembly 20, such as a vehicle seat assembly 20 is illustrated. In other examples, the seat assembly 20 may be shaped and sized as a front row driver or passenger seat, a second, third, or other rear row seat, and may include bench-style seats as shown, bucket seats, or other seat styles. Furthermore, the seat assembly may be a non-stowable seat or a stowable seat that may be foldable and stowable in a cavity in the vehicle floor. Additionally, the seat assembly 20 may be configured for use with other non-vehicle applications.

The seat assembly 20 has a frame 22 or other support structure. The seat assembly has seat components, and these seat components include at least a seat bottom 24 and a seat back 26. The seat bottom 24 may be sized to receive a seated occupant to support a pelvis and thighs of the occupant. The seat back 26 may be sized to extend upright from the seat bottom 24 to support a back of the occupant. The seat assembly may additionally have a head restraint 27, with the head restraint 27 illustrated for an adjacent seat assembly only. The seat bottom 24 has a seat bottom cushion 28. The seat back 26 has a seat back cushion 30. The frame 22 may include wire suspension mats or other structure to support the cushions 28, 30.

The frame 22 provides rigid structural support for the seat components, e.g. the seat bottom 24 and seat back 26, and may be provided as multiple frame members that are moveable relative to one another to provide adjustments for the seat assembly. The frame may be formed from a stamped steel alloy, a fiber reinforced polymer, or any suitable structural material.

A trim cover 32 is used to cover the seat bottom cushion 28 and the seat back cushion 30, and provide a seating surface for the seat assembly 20. The vehicle seat assembly 20 is shown without a trim cover, and the adjacent seat assembly illustrates the trim cover 32. In one example, the trim cover 32 covers both of the cushions 28, 30. In other examples, multiple trim covers are provided to cover the seat bottom cushion and the seat back cushion. The trim cover 32 may be formed from one or more panels of a fabric, leather, leatherette, vinyl, or other material.

A seating cushion 40 is described in further detail below, and the description may similarly be applied to the seat bottom cushion 28 or the seat back cushion 30.

In the example shown, the seating cushion 40 includes at least one nonfoam component or member 42. In one example, and as shown, the seating cushion 40 is formed solely from the nonfoam component 42, such that the nonfoam component 42 provides all of the cushioning for the seat component between the frame 22 and the trim cover 32. In other examples, the seating cushion 40 may be formed from a nonfoam component 42 as well as one or more foam components, such as a component formed from molded polyurethane foam. The seating cushion 40 may have the nonfoam and foam components positioned to provide different regions of the cushion 40 for the seating component, e.g. a central region, and side bolster regions. Alternatively, or additionally, the seating cushion 40 may have a thin foam or other material layer positioned between the nonfoam component 42 and the trim cover 32 to provide additional cushioning for one or more regions of the seating component. Furthermore, the seat assembly 20 may have a heating pad or heating mat positioned between the cushion 40 and the trim cover 32. By removing some or all of the traditional foam from the seating cushion 40, the seat assembly 20 may be provided with improved support and comfort, and reduced weight. In other examples, the seating cushion 40 may be formed from a foam material, such as a molded polyurethane foam.

In one non-limiting example, the nonfoam component or member 42 of the seating cushion 40 is formed by a stranded mesh material, also known as an entangled three-dimensional filament structure. The stranded-mesh material is made from a polymeric mesh having a plurality of integrated polymeric strands. The stranded-mesh material may be made from, for example, a linear low density polyethylene (LLPDE) material, although other polymers and materials effective to provide the desired properties and functionality are contemplated. The stranded-mesh material may be formed using extruded filaments of linear low-density polyethylene (LLDPE) that are randomly entangled, bent, looped, or otherwise positioned and oriented, and directly bonded to each other to provide a porous mesh structure, an example of which is shown in a closer view in FIG. 3. The present disclosure is generally described with respect to a stranded-mesh material member 42 below by way of example; however, another nonfoam component or form component may be used in place of the stranded-mesh material member 42 according to various embodiments of the disclosure.

Figure 2:
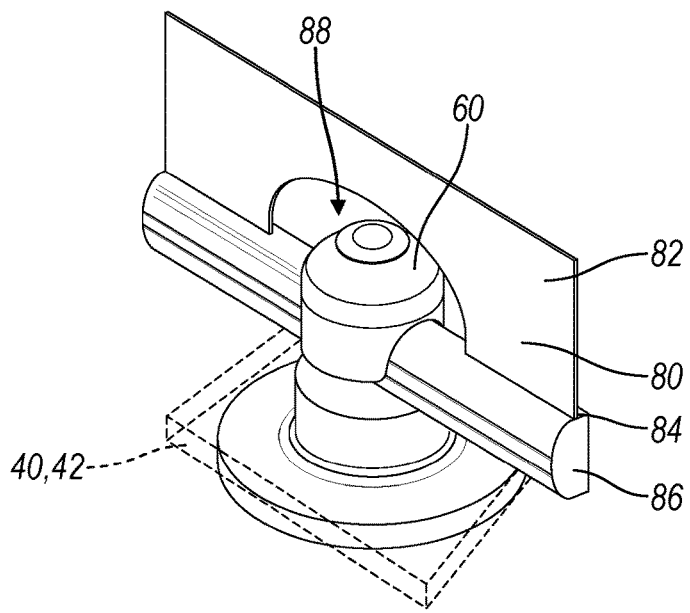
FIG. 2 illustrates a partial perspective view of the vehicle seat assembly of FIG. 1 with a fastener according to an embodiment.
Figure 3:
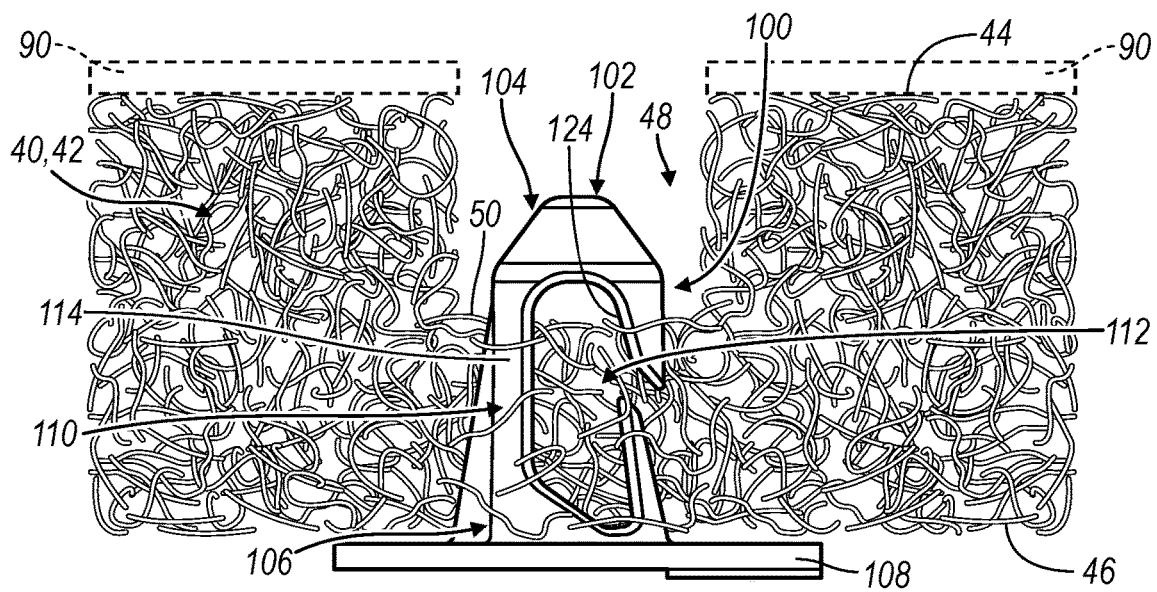
FIG. 3 illustrates a partial sectional view of the vehicle seat assembly of FIG. 1 with a fastener according to another embodiment.

Referring to FIGS. 1-3, the stranded-mesh material member 42 includes a first surface 44 and a second surface 46 positioned opposite to the first surface 44. The first surface 44 is positioned on the seat assembly 20 to support an occupant of the seat assembly. The first surface 44 defines at least one trench 48. As used herein, a trench 48 may refer to an open channel or groove that is formed in the stranded-mesh material member 42 and that intersects the first surface 44. A trench 48 may additionally refer to a recess or blind hole that is formed in the stranded-mesh material member 42 and that intersects the first surface 44. The trench 48 has a floor 50 that is positioned between the first and second surfaces 44, 46 of the stranded-mesh material member 42. The seating cushion 40 and stranded-mesh material member 42 therefore have a first thickness between the first and second surfaces 44. 46 adjacent to the trench, and a second thickness between the floor 50 and the second surface 46, with the second thickness being less than the first thickness.

One or more fasteners 60 are provided and are used to connect or attach the trim cover 32 to the seating cushion 40, which may include a stranded-mesh material member 42 as described above, or be formed from another material. FIG. 2 illustrates a fastener 60 according to one example, and FIG. 3 illustrates a fastener 100 according to another example. The fastener 100 has a longitudinal body 102 extending from a first end region 104 to a second end region 106. The fastener 100 has a base 108 extending outwardly from the second end region 106 and transversely to the body 102. The first end region 104 tapers in a direction away from the second end region 106. A central region 110 of the body 102 is positioned between the first and second end regions 104, 106 and defines a recess 112 intersecting a side wall 114 of the body 102. The recess 112 is angled inwardly and towards the first end region 104 to form a hook. Fastener 60 has similar features as that described above for fastener 100, with a body 102, base 108, and recess 112 with a hook.

The fastener 100 is positioned to extend through the stranded-mesh material member 42 with the base 108 abutting the second surface 46. In other examples, the fastener 100 is positioned to extend through the seating cushion 40 or a component thereof. The first end region 104 of the body extends into the trench 48. The fastener 60 is inserted through the stranded-mesh material member 42 from the second surface 46. The fastener 60 may be inserted by pushing or exerting a force on the base 108 of the fastener, e.g. via a pin or other member on a fixture during the assembly process. The tapered first end region 104 of the fastener 60 pushes through the strands of the member 42 as it is inserted, and creates its own hole or pathway through the stranded-mesh material member 42 during insertion. In one example, there is no pilot hole or other hole for a fastener 100 that is formed or otherwise provided in the stranded-mesh material member 42 before the fastener 100 is inserted. In another example, the cushion member 40 may be provided with a preformed aperture for the fastener 100. As such the fixture for assembly may require a guide or other alignment features for the cushion member 40 or stranded-mesh material member 42 in order for the fastener 100 to be inserted into the trench 48. In a foam cushion, the fasteners may be overmolded or otherwise surrounded by the foam to position and locate the fasteners relative to the foam; however, these ways of attaching fasteners are unavailable for a nonfoam cushion 40, or stranded-mesh material member 42, as disclosed herein.

Referring to FIGS. 1-3, The trim cover 32 is provided with a tie down 80. The fastener 60 engages with the tie down 80 to connect the trim cover 32 to the seating cushion and stranded-mesh material member 42. In one example, the tie down 80 is formed from a nonwoven material and has a first edge region 82 and a second edge region 84. The first edge region 82 is sewn, glued, welded, or otherwise attached to the underside of the trim cover 32, or into a seam joining adjacent panels of the trim cover 32. The second edge 84 is connected to a bead 86. The bead 86 may be formed from a plastic or other rigid material. The tie down 80 defines an aperture 88 between the two edge regions 82, 84. The body of the fastener extends through the aperture 88 to connect the trim cover 32 to the seating cushion 40, and the hook retains the tie down 80 relative to the fastener 60. In one example, the aperture 88 is directly adjacent to the bead 86 such that the hook of the fastener 60 engages with the bead 86 itself, e.g. the aperture 88 is defined at least in part by the bead 86. In other examples, the aperture 88 may be spaced apart from the bead 86 and be defined only via the nonwoven portion of the tie down 80.

An optional cushion layer 90 is shown in FIG. 3 in broken lines, with the cushion layer 90 overlaying the first surface 44 of the stranded-mesh material member 42, such that it is positioned between the first surface 44 of the stranded-mesh material member and the trim cover.

Figure 4:
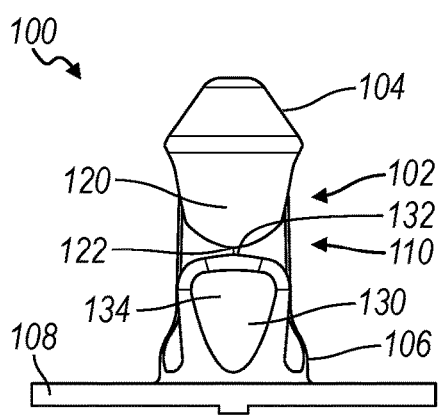
FIG. 4 illustrates a front view of the fastener of FIG. 3.
Figure 6:
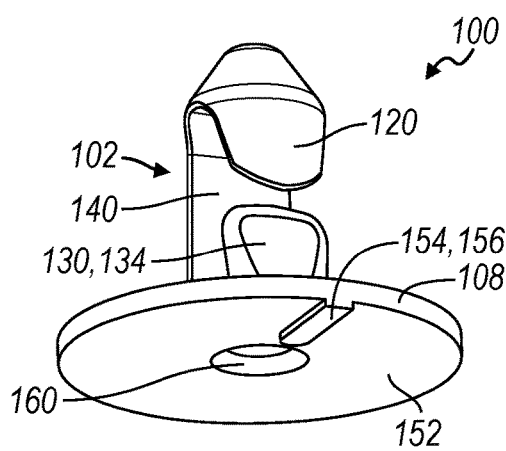
FIG. 6 illustrates a bottom perspective view of the fastener of FIG. 3.
Figure 5:
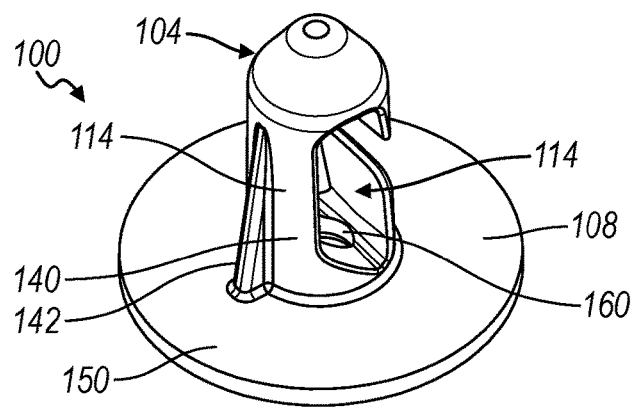
FIG. 5 illustrates a top perspective view of the fastener of FIG. 3.

FIG. 3 illustrates a partial sectional view of a seating cushion 40 of FIG. 1 as described above, and a fastener 100 according to an embodiment. FIGS. 4-6 illustrate additional views of the fastener 100 of FIG. 3.

The longitudinal body 102 extends from the first end region 104 to the second end region 106. The longitudinal body 102 has a side wall 114 surrounding the longitudinal axis. The central region 110 is positioned between the first and second end regions 104, 106. As shown in FIGS. 3-6, the body 102 has a generally circular cross-sectional shape. As used herein, "generally" means an outer perimeter including any recessed areas, and omitting any ribs or other features that protrude outwardly from the body 102. As used herein, "generally" also means an outer perimeter that has a circular or other curved non-circular shapes such as an ellipse, oval, or oblong, with a distance from the center (or longitudinal axis of the fastener) varying by no more than twenty percent when taken in a transverse plane.

The first end region 104 of the body tapers in a direction away from the second end region 106, and is tapered to a rounded or blunt end or nose. In one example, the first end region 104 may have an ogive shape, with a parabolic or other rounded end or nose. The tapered shape of the first end region 104 allows the fastener 100 to be easily inserted through the stranded-mesh material member 42, and also provides a rounded or blunt nose for occupant comfort if the cushion 40 compresses sufficiently during use such that the occupant could feel the fastener 100.

A central region 110 of the body is positioned between the first and second end regions 104, 106 and defines a recess 112 intersecting a side wall 114 of the body. The recess 112 is angled inwardly and towards the first end region 104 to form a hook in the fastener. The recess 112 and hook are shaped and sized to receive the tie down, e.g. the bead of the tie down.

The body 102 defines a first finger 120 extending from the first end region 104 towards the base 108 and to a first distal end 122. The first finger 120 cooperates with the central region 110 to define the recess 112 and form the hook. The first distal end 122 of the first finger 120 may have a convex profile as shown in FIG. 4 to help retain the tie down 80. The inner surface 124 of the first finger 120 may be shaped such that the tie down 80 is guided towards the first end region 104 once inserted into the recess 112.

In some examples, and as shown, the body 102 also defines a second finger 130 extending from the second end region 106 towards first end region 104 and to a second distal end 132. The second finger 130 may be angled inwardly relative to the body 102 to its second distal end 132 as shown. The second finger 130 also cooperates with the central region 110 to define the recess 112. The recess 112 may be collectively defined by the first and second fingers 120, 130, and the neck 140.

The second finger 130 may prevent or limit strands of the stranded-mesh material member 42, or other cushion member 40 material, from entering the recess 112 as the fastener 100 is inserted therethrough. The second finger 130 may also aid in the retention of the tie down 80 in the recess 112. The second finger 130 may have an average transverse thickness that is less than an average transverse thickness of the first finger 120 so that the second finger 130 is able to flex or move relative to the body 102. This enables the second finger 130 to deflect when the tie down 80 is being inserted into the recess 112. The second finger 130 also has an outer guide face 134, which may be a planar face as shown. The outer guide face 134 likewise aids in the insertion of the tie down into the recess 112.

In one example, and as shown, the first distal end 122 of the first finger and the second distal end 132 of the second finger are nonoverlapping in a transverse direction. In other examples, the first distal end 122 of the first finger and the second distal end 132 of the second finger may overlap one another in the transverse direction, which may further aid in retention of the bead of the tie down 80.

The body 102 forms the neck 140 adjacent to the recess 112 in the central region 110. A rib 142 or fin extends longitudinally and outwardly from the side wall 114 of the fastener from the base 108 and second end region 106 towards the first end region 104. The rib 142 may be tapered as shown towards the first end region 104 to aid in fastener insertion. The rib 142 or fin overlaps the neck 140 of the fastener to reinforce the neck.

The base 108 extends outwardly and transversely from the second end region 106. The base 108 has a first surface 150 facing the first end region 104 of the body, and a second surface 152 opposite to the first surface. The tie down 80 may exert a tensile force on the fastener 60, 100 when it is engaged with the installed fastener 60, 100 as shown in FIGS. 2-3. The first surface 150 of the base 108 engages and cooperates with the second surface 46 of the cushion member 40 or stranded-mesh material member 42 to limit movement of the fastener 100 and retain the fastener 100 in its location in the cushion member 40 or stranded-mesh material member 42.

The base 108 may define one or more indicia 154 indicative of the orientation of the recess 112 and hook of the fastener. In the example shown, the base 108 has a radial protrusion 156 or fin extending from the second surface 152 of the base from a central region of the base 108 towards the edge of the base, with the protrusion 156 radially aligned with the recess 112 and hook. In other examples, the indicia 154 may be provided as a groove in the second surface 152 of the base. In further examples, the cross-sectional shape of the base 108 may be provided with a non-circular shape, for example, as a D-shape, or with a notch or other flat edge, to provide the orientation indicia 154 for the recess 112 and hook. The fixture used for inserting the fastener 100 may be provided with a feature that mates or engages with the orientation indicia 154 to align the fastener 100 relative to the fixture and cushion member 40 or stranded-mesh material member 42. Alternatively, the orientation indicia 154 may be used as a visual indicator for manual insertion of the fastener into the cushion member 40 or stranded-mesh material member 42.

The fastener may also define a central aperture 160 extending longitudinally through the second end region 106 and intersecting the base 108 as shown. In the example shown, the central aperture 160 may also intersect the recess 112 such that it is a through-hole. The central aperture 160 may be used with a pin or other member of a fixture used in installing the fastener 100 in the cushion member 40 or stranded-mesh material member 42. The pin is inserted into the central aperture 160. A shoulder may be provided on the pin such that it exerts a force against the second surface 152 of the base. Alternatively or additionally, the pin may extend into the recess 112 during installation such that the pin exerts a force on the inner surface of the recess 112 adjacent to the first end region 104. In other examples, the fastener 100 may be provided without a central aperture, with an insertion force to be exerted on the second surface 152 of the base 108.

Instead of an indicia 154 formed on the base 108 as shown, the aperture 160 could alternatively be formed with a cross-sectional shape to provide the orientation indicia, e.g. with a D-shape, or with a notch or other flat edge. The pin or other member on the fixture that inserts the fastener through the cushion member 40 or stranded-mesh material member 42 may then be formed with a corresponding shape for the aperture 160 to orient the fastener.

Figure 7:
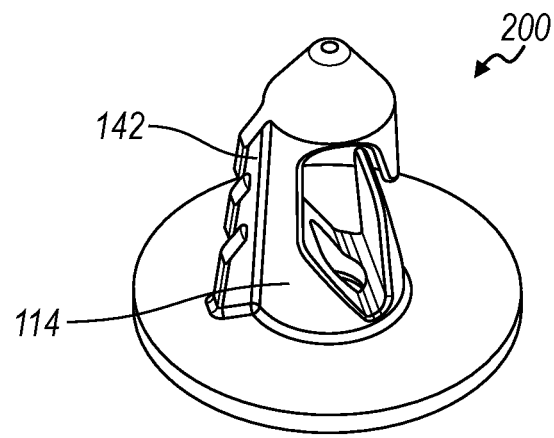
FIG. 7 illustrates a top perspective view of a fastener according to yet another embodiment.
Figure 9:
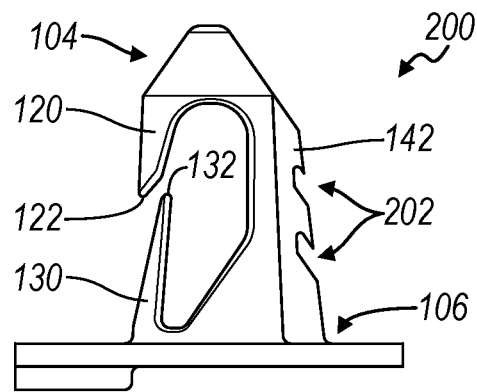
FIG. 9 illustrates a side view of the fastener of FIG. 7.
Figure 8:
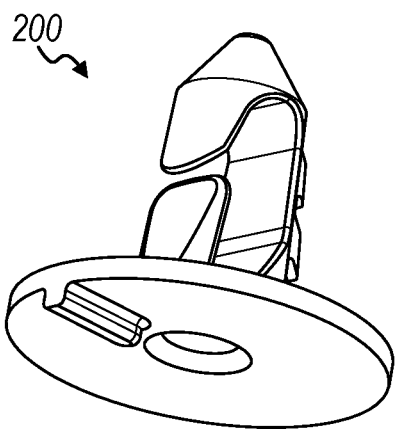
FIG. 8 illustrates a bottom perspective view of the fastener of FIG. 7.

FIGS. 7-9 illustrate a fastener 200 according to yet another embodiment. The fastener 200 may be used with the vehicle seat assembly 20 as described above with respect to FIGS. 1-3. Elements that are the same as or similar to those described above with respect to FIGS. 1-6 have the same reference numbers for simplicity. Furthermore, only features that differ from that described above are described in detail below.

Similar to the fastener 100 of FIGS. 3-6, the fastener has a rib 142 extending outwardly from the side wall 114 of the body from the second end region 106 towards the first end region 104. The rib 142 also tapers towards the first end region 104. The rib 142 defines at least one barb 202 angled away from the first end region 104. The barbs 202 acts to retain the fastener 200 in the cushion member 40 or stranded-mesh material member 42 and limit or prevent the fastener from backing out of the cushion member 40 or stranded-mesh material, e.g. by moving in a direction away from the trench 48 and tie down. Once engaged with the strands of the stranded-mesh material member 42, the barbs 202 may additionally limit rotational movement of the fastener 200 in the cushion member 40 or stranded-mesh material member 42, e.g. rotational movement about the fastener's longitudinal axis. As shown, the shape and size of the spacing between the barbs 202 may be formed to receive one or more strands of the stranded-mesh material.

Also, and as shown, the first distal end 122 of the first finger 120 and the second distal end 132 of the second finger 130 overlap one another in the transverse direction, which may further aid in retention of the bead of the tie down.

Figure 10:
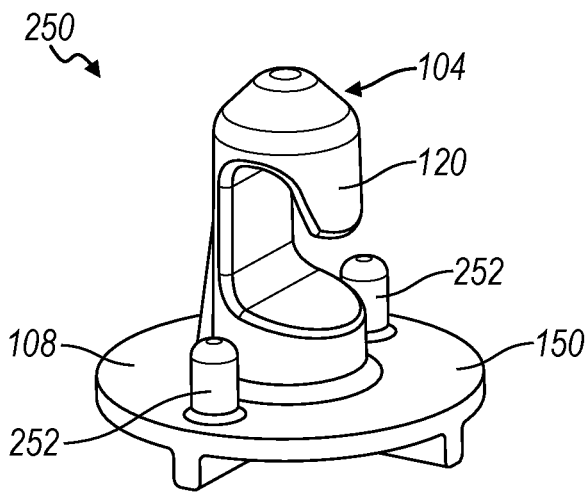
FIG. 10 illustrates a top perspective view of a fastener according to another embodiment.
Figure 12:
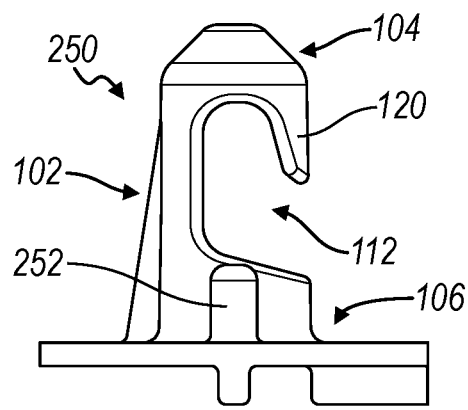
FIG. 12 illustrates a side view of the fastener of FIG. 10.
Figure 11:
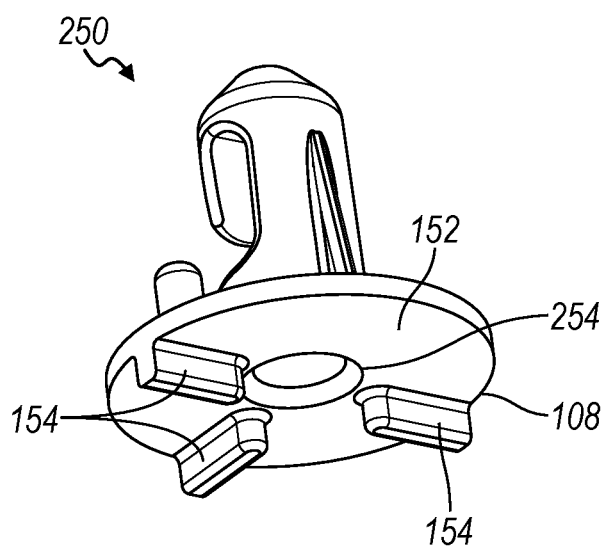
FIG. 11 illustrates a bottom perspective view of the fastener of FIG. 10.

FIGS. 10-12 illustrate a fastener 250 according to yet another embodiment. The fastener 250 may be used with the vehicle seat assembly 20 as described above with respect to FIGS. 1-3. Elements that are the same as or similar to those described above with respect to FIGS. 1-6 have the same reference numbers for simplicity. Furthermore, only features that differ from that described above are described in detail below.

The fastener 250 is provided with only a first finger 120, and without a second finger. The first finger 120 is sufficiently long to retain the tie down 80 in the recess 112, along with the tensile force on the tie down and fastener.

The first surface 150 of the base 108 defines at least one post 252 extending longitudinally outwardly therefrom. Although two posts 252 are shown, a single post or more than two posts is also contemplated. The posts 252 are spaced apart from the body 102 of the fastener. Once engaged with the cushion member 40 or stranded-mesh material member 42, the posts 252 limit rotational movement of the fastener 250 in the cushion member or stranded-mesh material member, e.g. rotational movement about the fastener's longitudinal axis. The posts 252 have a length that is less than a length of the body 102, and also have a diameter that is less than a diameter of the second end region 106 of the body. The posts 252 are shown as having a generally smooth outer surface, however, it is also contemplated that the outer surface of the posts 252 may be provided with barbs angled away from the first end region 104 to further limit longitudinal movement of the fastener 250 relative to the cushion member 40 or stranded-mesh material 42.

The second surface 152 of the base 108 defines multiple indicia that cooperate to provide an indication of the orientation of the hook and recess 112.

The fastener 250 defines a central aperture 254 extending longitudinally through the second end region 106 and intersecting the base 108. As shown in FIGS. 10-11, the central aperture 160 is formed as a blind hole that does not intersect the recess 112.

It is additionally contemplated that various features of the fasteners 60, 100, 200, 250 as shown and described above with respect to FIGS. 2-12 may be interchanged with one another to form further fasteners of the disclosure.

A method of assembling the seat assembly is also provided. The cushion member is formed or otherwise provided, and may be provided as a foam member or a nonfoam member. According to one example, and for a stranded-mesh material member, the member 42 may be formed by extruding thin filaments of linear low-density polyethylene, or another suitable material through a die plate from a hopper or other source of material. The thin filaments may be heated as they are extruded such that they exit the die plate in a molten state. The filaments are then consolidated or grouped together, via a funnel or similar structure, so that the filaments bend or loop and contact and bond with other filament(s). The grouped filaments may then enter a water bath or other cooling system to provide additional resistance for further bending or looping of the filaments, prevent further consolidation of the filaments and maintain the porosity of the structure, and cool and solidify the filaments to prevent additional bonds between them. The water or cooling system may include various rollers or other conveying members that act to move the consolidated filament structure, and that may additionally form one or more trenches or other shapes into the filament structure. The consolidated filament structure is then dried and cut into the appropriate shape for a cushion member 42. If no trenches are formed into the structure during the forming process, e.g. in the cooling system, then trenches may be machined, or otherwise provided in the stranded mesh material member after it has been dried, and before or after it is cut into the selected shape. The non-foam material cushion is formed without a preformed hole for the fasteners 60, 100, 200, 250 according to one example. According to another example, a preformed hole for the fasteners 60, 100, 200, 250 is formed when the member 40 is formed, or is machined or otherwise formed afterwards.

The stranded-mesh material member 42, with a trench 48, is then placed into a tool with a fixture for inserting the fastener(s) 60, 100, 200, 250. The fastener(s) 60, 100, 200, 250 are provided on the fixture, which locates and orients the fastener(s) 60, 100, 200, 250 relative to the member 42 and trench as described above. The fixture may be needed to locate and orient the fastener(s) 60, 100, 200, 250 as the trench 48 is not visible from the surface 46. The tapered distal end 104 of a fastener 60, 100, 200, 250 is inserted through the cushion member 40 or stranded-mesh material member 42 until a base 108 of the fastener abuts an outer surface 46 of the cushion and the distal end 104 extends into the trench 48 formed in the opposite outer surface 44 of the cushion 40.

A trim cover 32 is then positioned over the outer surface 44 of the cushion member 40. The trim cover 32 is provided with a tie down 80. The tie down 80 is connected to the fastener 60, 100, 200, 250 by inserting a hook defined by the fastener to an aperture through the tie down to connect the trim cover to the cushion. The tie down 80 is received within the recess 112 of the fastener 60, 100, 200, 250.

The cushion member 40 or stranded-mesh material member 42 may need to be compressed from its relaxed state in order for the tie down 80 to connect to the fastener 60, 100, 200, 250. As such, the cushion member 40 stranded-mesh material member 42 may exert a force on the trim cover 32 that places the tie down 80 and fastener 60, 100, 200, 250 in tension. Additionally, and when the trim cover 32 is wrapped or otherwise connected to the various connection points for the seat assembly, the trim cover 32 may be stretched or placed in tension, which may further increase the tensile force on the tie down 80 and fastener 60, 100, 200, 250. Movement of the fastener 60, 100, 200, 250 in the longitudinal direction is limited by the engagement of the base 108 with the surface 46 of the member 40. As such, the fastener 60, 100, 200, 250 is retained in the member 42 when the seat assembly 20 is assembled. Features such as a rib 142 or posts may limit rotational movement of the fastener within the member 40. Additionally, features such as barbs 202 may limit longitudinal movement of the fastener, and for example, may prevent the fastener 60, 100, 200, 250 from backing out of the member 40.

While exemplary embodiments are described above, it is not intended that these embodiments describe all possible forms of the disclosure. Rather, the words used in the specification are words of description rather than limitation, and it is understood that various changes may be made without departing from the spirit and scope of the invention. Additionally, the features of various implementing embodiments may be combined to form further embodiments of the disclosure.

What is claimed is:

1. A seat assembly comprising:
    a seating cushion defining a first surface to support an occupant and a second surface opposite to the first surface, the first surface further defining a trench; and
    a fastener with a longitudinal body having a central region positioned between a first end region and a second end region, and a base extending outwardly from the second end region and transversely to the body, the first end region tapering in a direction away from the second end region, the central region of the body defining a recess intersecting a side wall of the body and angled inwardly and towards the first end region to form a hook, wherein the fastener defines a central aperture extending longitudinally through the second end region and intersecting the base;
    wherein the fastener extends through the seating cushion with the base abutting the second surface, and the first end region of the body extending into the trench.

2. The seat assembly of claim 1 wherein the seating cushion is formed from a stranded-mesh material member.

3. The seat assembly of claim 2 wherein the stranded-mesh material member comprises a polymeric mesh having a plurality of integrated polymeric strands.

4. The seat assembly of claim 1 further comprising:
    a trim cover forming a seating surface; and
    a tie down connected to the trim cover;
    wherein the fastener engages with the tie down to connect the trim cover to the seating cushion.

5. The seat assembly of claim 4 wherein the tie down defines an aperture adjacent to a bead of the tie down; and
    wherein the body of the fastener extends through the aperture to connect the trim cover to the seating cushion.

6. The seat assembly of claim 5 wherein the aperture is defined at least in part by the bead of the tie down.

7. The seat assembly of claim 1 further comprising a frame supporting the seating cushion.

8. The seat assembly of claim 1 wherein the body defines a first finger extending from the first end region towards the base and to a first distal end, the first finger cooperating with the central region to define the recess and form the hook.

9. The seat assembly of claim 8 wherein the body defines a second finger extending from the second end region towards the first end region and to a second distal end, the second finger cooperating with the central region to define the recess.

10. The seat assembly of claim 9 wherein the second finger is angled inwardly relative to the body to the second distal end.

11. The seat assembly of claim 9 wherein the first distal end and the second distal end are nonoverlapping in a transverse direction.

12. The seat assembly of claim 1 wherein the central aperture intersects the recess.

13. The seat assembly of claim 1 wherein the base has a first surface facing the first end region of the body, and a second surface opposite to the first surface; and
wherein the base defines at least one post extending longitudinally outwardly from the first surface of the base, the at least one post spaced apart from the body.

14. The seat assembly of claim 1 wherein the base defines an indicia indicative of an orientation of the hook.

15. The seat assembly of claim 1 wherein the central region defines at least one barb extending outwardly therefrom and angled away from the first end region.

16. A fastener comprising:
a member forming a longitudinal body with a central region positioned between a first end region to a second end region, the body having a generally circular cross-sectional shape with a side wall surrounding a longitudinal axis, the first end region tapering in a direction away from the second end region to a rounded nose, wherein the member forms a base extending outwardly from the second end region and transversely to the body, the central region of the body defining a recess intersecting the side wall of the member and extending transversely into the central region of the body and towards the first end region to form a hook.

17. The fastener of claim 16 wherein the body defines a first finger extending from the first end region towards the base and to a first distal end, the first finger cooperating with the central region to define the recess and form the hook; and
wherein the body defines a second finger extending from the second end region towards the first end region and to a second distal end, the second finger cooperating with the central region to define the recess, the second finger angled inwardly relative to the body from the second end region to the second distal end.

18. The fastener of claim 16 wherein the member defines a central aperture extending longitudinally through and intersecting the base.

19. A method of assembling a seat assembly, the method comprising:
inserting a tapered distal end of a fastener through a cushion until a base of the fastener abuts a first outer surface of the cushion and the distal end extends into a trench formed in a second outer surface of the cushion opposite to the first surface, the fastener inserted from the first outer surface towards the second outer surface, the second outer surface positioned to support an occupant of the seat assembly;
positioning a trim cover with a tie down over the second surface of the cushion; and
inserting a hook defined by the fastener through an aperture defined by the tie down to connect the trim cover to the cushion.

20. The method of claim 19 further comprising forming the cushion from a stranded-mesh material without a preformed hole for the fastener.

\* \* \* \* \*